FREE-TRACKING PHONOGRAPH PICKUP

Original Filed Dec. 9, 1964

INVENTOR
Jacob Rabinow

BY Max L. Libman
ATTORNEY

United States Patent Office 3,390,886

Patented July 2, 1968

3,390,886
FREE-TRACKING PHONOGRAPH PICKUP

Jacob Rabinow, 6920 Selkirk Drive, Bethesda, Md. 20034

Original application Dec. 9, 1964, Ser. No. 417,178. Divided and this application May 10, 1967, Ser. No. 637,434

5 Claims. (Cl. 274—23)

ABSTRACT OF THE DISCLOSURE

A very small, lightweight phonograph pickup having low-friction means for moving the stylus in a radial line as a disc record is played, said head being so small as to lie completely within and above the turntable periphery, being pivotally movable at the stylus and toward and away from a record being played, the pivotal axis of such movement being very close to the record playing surface to substantially eliminate excursions of the stylus along the record groove.

Figure 1:
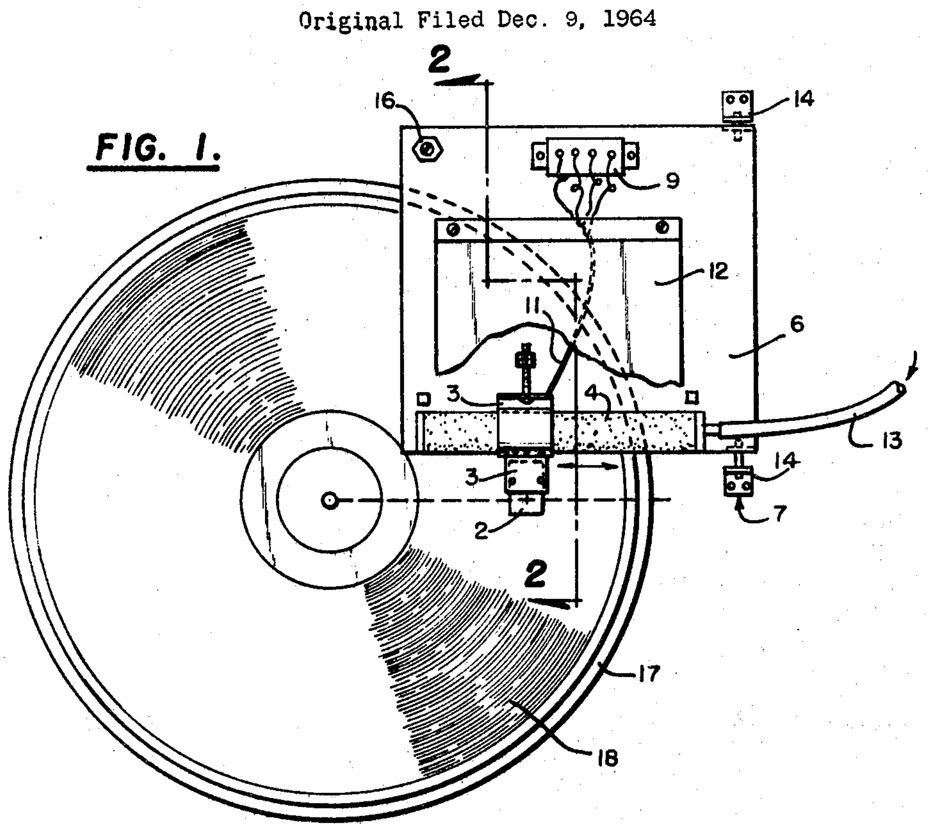

This is a division of application Ser. No. 417,178 of Jacob Rabinow, filed Dec. 9, 1964, now Patent No. 3,356,372.

This invention relates to means for supporting phonograph pickups and particularly to means for guiding phonograph pickups to move across the record in a straight line so that the pickup is always tangent to the record groove when playing conventional flat disc records.

It is well known that records are cut on lathes so that the cutter moves in a straight line radially with respect to the record. If the playback mechanism is not tangent to the record, serious distortions are introduced and various means are employed to achieve tangency or approximate tangency between the groove of the record and the center line of the pickup. The most common technique used today is the offset arm in which the pickup is supported by a bent arm and so mounted that the pickup describes an arc across the record and maintains reasonably good tangency to the groove over the range of the radii covered in modern recordings. The offset arm, however, suffers in several respects. One is that the tangency is only an approximation, and two, that undesirable side pressures are produced on the stylus so that while the pickup body may be tangent, the stylus itself is pushed out of tangency and the unbalanced forces on the stylus and its supporting mechanism create displacement and distortions which are quite serious.

Straight line motions of the pickup which assure tangency have been the goal of designers from the beginning of the recording art. For example, one can cite the following devices which permit the pickup to move in a straight line supported by a rolling carriage: Morton, No. 948,959; Bard, No. 2,869,877; and De Weese, No. 2,532,293. Another approach is shown in my Patent No. 2,915,315, where the pickup is mounted on a fairly conventional arm except that the arm itself is mounted on a moving carriage which is servoed to the tangency angle in such a way that the carriage moves to maintain the pickup tangent to the groove. While the servo arm has proved entirely satisfactory in actual practice, it is a fairly elaborate and expensive device and does not eliminate the additional mass which consists of a portion of the arm, and which is added to the pickup. In modern pickups the compliance of the stylus is very high, that is, the mounting is quite soft, and the mass of the stylus is very small so that the forces which the record produces on the stylus are small. The tendency in modern pickup design is to make the stylus mass smaller and smaller and the compliance higher and higher. Present pickups are made to play with a vertical pressure of between 0.5 and 3.0 grams, and stylus compliances of the order of $10^{-6}$ dynes per centimeter. It is probable that the compliances will increase far beyond this and the weight will decrease further as development of modern pickups continues. The body of the pickup, however, and a portion of the arm on which it is mounted produce an equivalent mass which resonates against the compliance of the stylus. This reasonance, unfortunately, has a very undesirable effect. Because of the very high compliance of the stylus mounting, the resonance produces large low frequency excursions, unless heavily damped, whenever the stylus is excited by a transient, which occurs frequently in playing music or because of the eccentricities of the record. Damping is, of course, utilized both in the mounting of the stylus to the pickup head, and sometimes in the mounting of the whole arm. Viscous damping has been employed in the bearings, and has been employed in dynamic fashion as, for example, in U.S. Patent No. 3,031,196.

In any mounting it would be desirable to keep the mass of the pickup to as low a value as possible, which means that both the pickup itself and its supporting structure should be made as light as possible. The overall resonance of this combined mass against the stylus compliance should be at some frequency below the audio range; somewhere between 10–15 cycles is quite satisfactory. The pickup should behave as a rigid unit for the very low frequency oscillations due to eccentricities of the record, that is, the head and the stylus should move together so that no output results due to the low frequency motions of the head. But for frequencies in the audio range, that is, 20 cycles per second and above, the head should stand still while the stylus oscillates. This is achieved by making the head-stylus resonance in the range mentioned above. By keeping the pickup mass as small as possible, the amount of damping required is kept to a minimum. Small amounts of damping are highly desirable when using high compliance stylii.

When the pickup is mounted in an arm, a large part of the arm mass is reflected as an equivalent mass at the pickup head, that is, the mass that the stylus sees above it is not only the mass of the pickup itself but of a good portion of the arm. By having a counterweight close to the pivot, the mass of the counterweight is reflected only partially at the stylus, but the portion of the arm which is close to the pickup head is almost totally added to the mass of the pickup and forms an undesirable component of the total mass which produces large low frequency oscillations and requires considerable damping to control.

If one could devise a mounting for a pickup which requires no arm and which adds as little weight as possible to the moving system and, moreover, one which produces a straight-line motion of the pickup to maintain tangency, one would have a most desirable mounting. Moreover, the mounting has to satisfy some other mechanical requirements. It should be free to move left and right, both to follow the low frequency oscillations of eccentric grooves, and to follow the normal spiralling of the grooves toward the inside of the record. Moreover, it must be free in the up-and-down direction because records sometimes are not flat, both because of normal warpage, and because turntables are not necessarily completely free of up and down eccentricities. The motions mentioned here are obviously of low frequency, and the pickup mounting should be so designed as to follow these motions with as little resistance as possible.

Prior attempts to mount pickups so that they move in a straight line along a track have suffered in that they were not free enough for present pickups. The wheels and bearings shown in the patents mentioned above, which were typical, would be entirely unsuitable for modern one-gram pickups. The other difficulty with the devices of the prior art is that the pickups did not have enough vertical compliance so they could not move up and down as easily as they could move left and right. This is absolutely necessary with modern stereo pickups which have vertical compliances of the same low values as their lateral compliances. Another mechanical requirement which must be met by mounting is that when the pickup does move up and down due to the wobble of the record, the stylus should not move forward and back along the groove as the result of this motion. If the stylus does have an appreciable forward and back or longitudinal motion, it will produce "wow."

To summarize the above, what is needed is a pickup mounting which requires no arm or as little arm mechanism as possible; which permits the stylus to move laterally and up and down with almost complete freedom; and one so arranged that when the stylus does move up and down, there is a negligible longitudinal motion, so as to minimize "wow." I have met the above requirements in the invention of this specification, which shows two basic embodiments of the invention. One uses an air bearing which has its horizontal axis at the surface of the record and the second, where the horizontal axis is very close to the surface of the record. In both cases, the lateral motion is sufficiently free to play records with the best and lightest of modern pickups.

Figure 2:
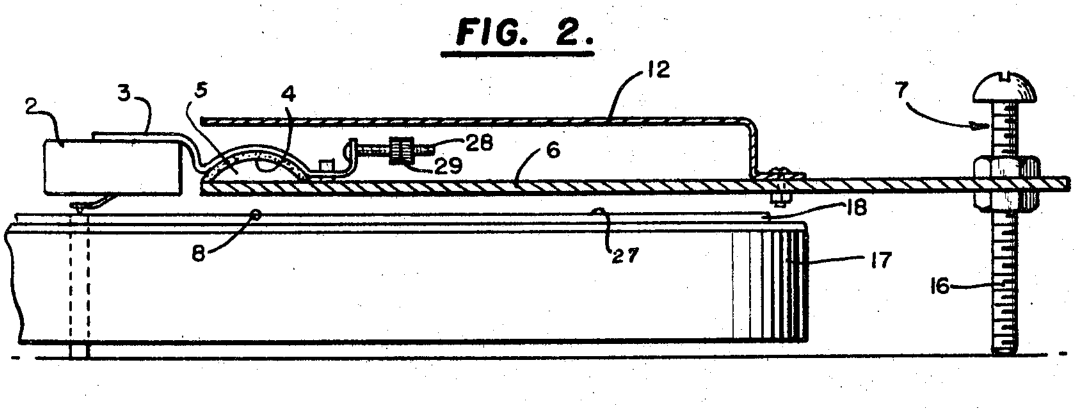

The specific nature of my invention, as well as other objects and advantages thereof, will clearly appear from a description of a preferred embodiment as shown in the accompanying drawings, in which:

FIG. 1 shows a top view of a pickup supported by an air bearing which provides a rotary motion about the horizontal axis at the surface of the record and a sliding air bearing for the lateral motion; and FIG. 2 shows a side view of the same invention.

Referring to FIGS. 1 and 2, the conventional pickup head is shown at 2. Attached immediately to it or made integral with the head is a curved sheet member 3. This member 3 rests on the curved porous member 4 which provides the air bearing. The curved member 4 is attached by welding or cementing to a flat member 6 which is supported immediately above the surface of the record but not in contact with it. A suitable hinged structure 7 is used to support this above the record and arranged to be swung out of the way when the record is to be changed. Air under pressure is supplied to the chamber 5 under the curved member 4. A suitable remote pump of any conventional design can be used for this purpose. The curved member 4 can be made of a porous material such as sintered bronze commonly used for bearings. The air escaping through the pores of this material forms a cushion for the curved member 3 attached to the phonograph arm. By making the center of curvature of the member 4 to lie at the surface of the record as shown by point 8, the pickup has an effective center of rotation about this point. Thus, as the stylus is raised and lowered by an eccentric record, it will describe a very close approximation to vertical motion and will produce no "wow" due to this effect. The signal wires for the design of this invention will obviously have to be made light and thin, and I show them suspended from a terminal block 9, and joined into a light cable 11. In practice, I have used unshielded Litz wire, which is fine stranded wire of very great flexibility, and obtained the effect of shielding by covering the whole assembly with a sheet of metal 12, so that the wires were shielded from outside noise. The elimination of the normal shield and heavy insulation enables me to use very flexible wires which do not impede the motion of the pickup.

The air is supplied to curved member 4 from an external pump (not shown) by flexible tubing 13. The base member 6, which carries the entire assembly, is supported in any suitable manner, as by hinges 14 and adjustable stop 16, whereby the base 6 is adjusted with respect to turntable 17 and record 18.

The use of an external pump may be a drawback for household phonographs. It would, however, be tolerable in commercial applications. Furthermore, the design of the pickup mounting is so simple and so rugged that for this application the use of the pump is, in my opinion, warranted and the advantages of such a simple mechanism outweigh the disadvantages of using a small air pump, which may be driven by a suitably designed phonograph motor.

It will be apparent that the embodiments shown are only exemplary and that various modifications can be made in construction and arrangement within the scope of my invention as defined in the appended claims.

I claim:

1. In a phonograph for playing grooved disc records on a turntable, a pickup assembly comprising (a) a stylus for following the disc grooves, (b) a head mounting said stylus, (c) guide means supported by the phonograph, (d) said guide means including low-friction bearing means between said head and said guide means permitting limited pivotal vertical motion of the head about an axis substantially at the surface of a record disc mounted on said turntable, (e) said guide means also including bearing means for guiding said head with very low friction in a horizontal path such that the stylus moves along a radial path on the record, (f) said bearing means comprising a hollow porous element having a convex bearing surface which is a longitudinal sector of a cylinder, and a cooperating element having a concave bearing surface closely fitting said convex surface, said cooperating element being of much smaller axial extent than the convex bearing surface, (g) one of said elements being supported on said phonograph and the other being fixed to said head, (h) and means for supplying air under pressure to the interior of said hollow porous element to maintain a layer of air between the convex and concave surfaces so as to enable the concave surface to freely move both axially and circumferentially on the convex surface with very low friction.

2. The invention according to claim 1, and a base member upon which said assembly is mounted, and hinge means on said base member for hingedly mounting said base member on the phonograph for raising the head unit and stylus away from a record disc on the turntable.

3. The invention according to claim 2, said element having the concave bearing surface being fixed to the head whereby the head and stylus have limited rotational movement about the axis of curvature of said concave surface.

4. The invention according to claim 3, and constraining means for limiting the rotational movement of the head when said hinged base member is raised about its hinge to lift the head away from the disc playing surface.

5. The invention according to claim 1, said hollow porous element lying directly over the turntable, and the axis of said cylinder lying substantially in the plane of the playing surface of a disc record on said turntable.

References Cited

UNITED STATES PATENTS

| | | | |
|---|---|---|---|
| 2,695,108 | 11/1954 | Brugger. | |
| 2,710,234 | 6/1955 | Hansen. | |
| 2,942,385 | 6/1960 | Pal. | |
| 2,948,538 | 8/1960 | Tomaselli | 274—23.1 |
| 3,006,652 | 10/1961 | Mankovitz | 274—23.1 |
| 3,169,807 | 2/1965 | Abel et al. | |

FOREIGN PATENTS

| | | |
|---|---|---|
| 775,497 | 5/1957 | Great Britain. |

HARRY N. HAROIAN, *Primary Examiner.*